United States Patent [19]

Georgi

[11] 4,023,073

[45] May 10, 1977

[54] OPEN CIRCUIT DETECTOR

[75] Inventor: Donald Kenneth Georgi, Plymouth, Minn.

[73] Assignee: Graco Inc., Minneapolis, Minn.

[22] Filed: Dec. 8, 1975

[21] Appl. No.: 638,295

[52] U.S. Cl. ............................. 361/45; 307/202.1
[51] Int. Cl.² .................................... H02H 3/16
[58] Field of Search ............ 317/18 B, 18 A, 18 C, 317/31, 46, 48, 33 SC; 340/256, 253 B

[56] References Cited

UNITED STATES PATENTS

| | | | |
|---|---|---|---|
| 2,207,202 | 7/1940 | Deau | 317/18 B X |
| 2,554,598 | 5/1951 | Storch | 317/18 B |
| 2,880,377 | 3/1959 | Buckingham et al. | 317/18 B |
| 2,999,189 | 9/1961 | Gerrard | 317/18 B |
| 3,402,326 | 9/1968 | Guasco et al. | 317/18 B |
| 3,425,050 | 1/1969 | Tellerman et al. | 340/256 |
| 3,537,095 | 10/1970 | Cones | 340/256 X |
| 3,595,228 | 7/1971 | Simon et al. | 340/256 X |
| 3,696,364 | 10/1972 | Lavelle | 340/256 X |
| 3,823,342 | 7/1974 | Burr et al. | 317/18 A X |
| 3,903,430 | 9/1975 | Arns | 340/256 X |

Primary Examiner—Donovan F. Duggan
Assistant Examiner—Patrick R. Salce
Attorney, Agent, or Firm—Paul L. Sjoquist

[57] ABSTRACT

Apparatus is disclosed for monitoring an alternating current circuit having a three wire connection, wherein alternating voltage power is applied between two wires and the third wire is a circuit ground. The apparatus detects an open ground circuit and opens a circuit breaker to disconnect the voltage over the two alternating current wires whenever an open ground circuit is detected.

7 Claims, 3 Drawing Figures

OPEN CIRCUIT DETECTOR

BACKGROUND OF THE INVENTION

This invention relates to an apparatus for use in conjunction with electrical equipment, to monitor the ground circuit connection to such equipmemnt and to disable the voltage applied to the equipment whenever the ground circuit becomes opened. In one embodiment of the invention the apparatus senses the presence of a voltage between the alternating current power line and ground, and disables a circuit breaker connection controlling power to the equipment whenever a voltage cannot be sensed between the power line and ground. In another embodiment the apparatus also detects the quality of the ground circuit, and disables power to the equipment to which it is connected whenever the ground circuit resistance increases over a predetermined level.

In the past, most circuit monitoring apparatus has been designed for detecting a ground fault condition, wherein a short circuit condition exists betwen ground and some voltage point in the circuit being controlled. Prior art monitoring circuits have been devised for monitoring the degree of unbalance of current flow in power lines to thereby detect when one or more of these lines is losing current to a ground connection. Other circuits have utilized a pilot wire to monitor ground circuits, disabling the voltage power whenever either the pilot line or the ground line becomes opened.

All of these prior art circuits, as well as the present invention, function to provide protection for equipment and operators whenever a fault condition arises. The present invention is concerned primarily with operator protection, to disable the voltage applied to equipment the operator is handling whenever an open ground circuit is detected. The need for this operator protection is important, for if an open ground circuit occurs while an operator is handling electrical equipment the operator may suddenly become the only circuit path to ground and potentially fatal currents may flow through the operator's body.

Modern alternating current power supplies utilize three wires for delivering voltage and circuit ground to equipment and appliances connected thereto. A typical household 110 volt AC power receptacle has three sockets, one for delivering "hot" AC voltage, the second for delivering the AC voltage "neutral", and the third for providing an absolute circuit ground. When an equipment or appliance is plugged into such a receptacle, assuming it has a three-wire connecting cord, the "hot" line is connected to one side of the voltage circuits and the "neutral" line is connected to the other side of the voltage circuits, and frequently also to an internal equipment ground. The third or ground wire connection is made to the equipment chassis or case to assure that such chassis or case is maintained at an absolute ground potential. If the operator utilizes an extension cord having only two wires, or otherwise disables the third ground connection, the safety provided by the absolute ground connection to equipment chassis or case is eliminated, and a potential voltage shock situation exists. In this situation the present invention will disable the power applied to the equipment until a proper ground connection is made.

SUMMARY OF THE INVENTION

The present invention comprises a circuit for sensing the presence of a voltage between the hot voltage line and the third-wire or ground connection. The sensor circuit generates a signal for driving a control circuit which controls relay-actuated contacts in the hot line and/or in the neutral line. The equipment is connected to these relay contacts, so that whenever the sensor detects the absence of voltage across its connections the relay circuits open to remove all voltage applied to the equipment. In a second embodiment of the invention the sensor generates a test signal into the ground circuit and monitors the magnitude of the test signal, thereby measuring the relative resistance contained in the ground circuit. Whenever the test signal exceeds a predetermined maximum the sensor activates the control circuit to disable power to the equipment. In this manner the sensor can disable power whenever a ground circuit exists, but through faulty wiring or malfunction has developed excessive resistance for adequate grounding.

BRIEF DESCRIPTION OF THE DRAWINGS

The invention herein disclosed is made with reference to the drawings, in which.

DESCRIPTION OF THE PREFERRED EMBODIMENTS

Figure 1:
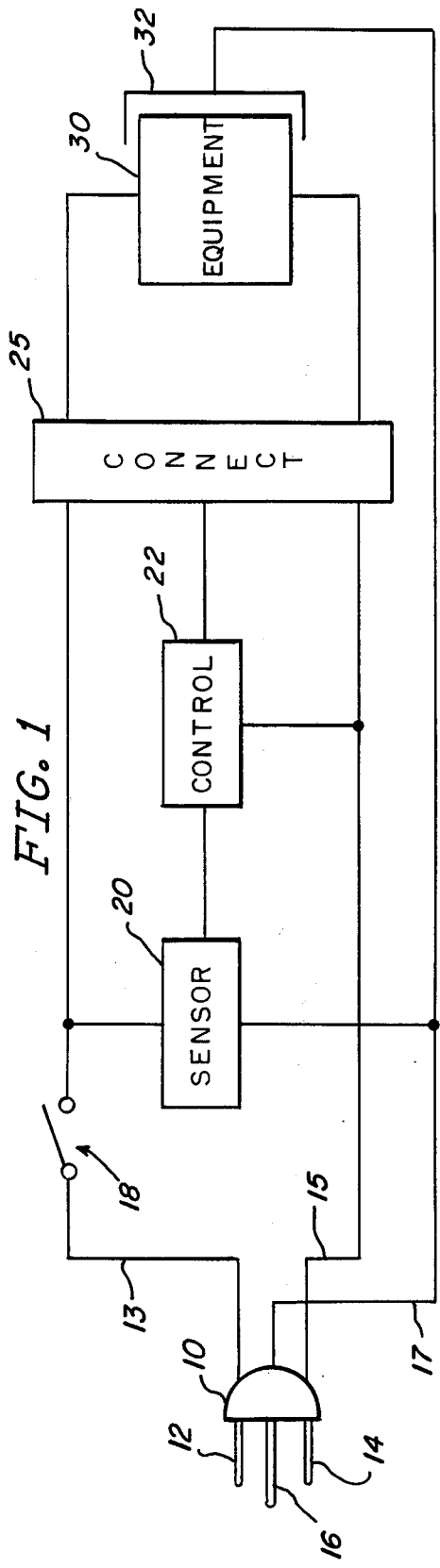
FIG. 1 is a block diagram of the invention.

FIG. 1 shows the invention in block diagram form. An alternating current power plug 10, of the type commonly used for plugging into AC power receptacles, has a hot line plug pin 12, a neutral line plug pin 14 and a ground plug pin 16. Wires 13, 15, and 17 are respectively connected to pins 12, 14, and 16. An on/off switch 18 is connected to wire 13, and respectively connects to sensor 20 and connect circuit 25. Sensor 20 is also connected to ground wire 17, and connect circuit 25 is wired to wire 15. A control circuit 22 is wired between sensor 20 and connect circuit 25. The equipment or appliance 30 to which power is to be delivered is connected to connect circuit 25. Such equipment has an exterior cover or case 32 which is wired to ground pin 16 via wire 17. Equipment 30 and case 32 may be any of a wide variety of conventional appliances which are operated on conventional AC power, such as 110 or 220 volt supplies.

Figure 2:
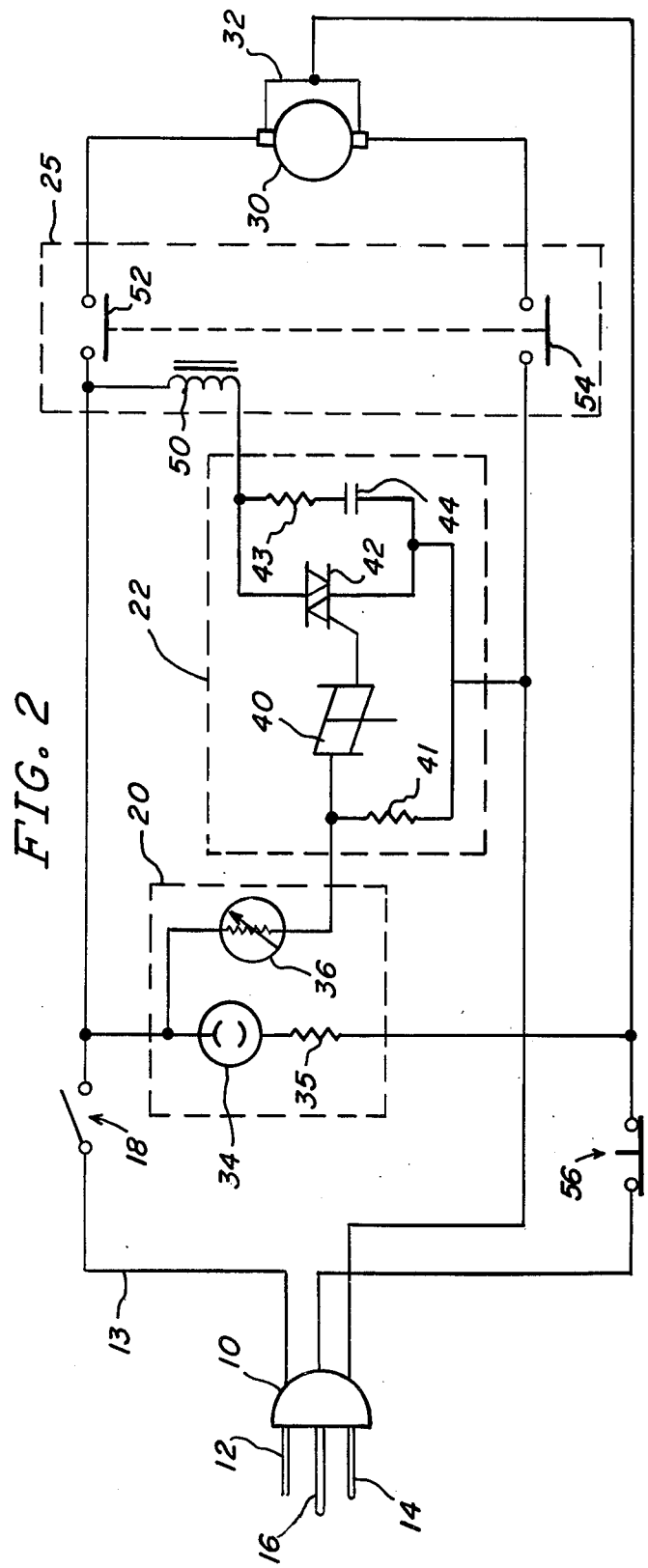
FIG. 2 is a schematic diagram of the preferred embodiment.

FIG. 2 illustrates in schematic form the preferred embodiment of the invention. Sensor 20 comprises a neon lamp 34 connected in series with a current limiting resistor 35, and a photocell 36 positioned to receive illumination from lamp 34. Lamp 34 may be type NE2, manufactured by Drake Manufacturing Company, and photocell 36 may be type VT-542L, manufactured by Vactec Inc. Current limiting resistor 35 is preferably about 150,000 ohms.

Control circuit 22 comprises a trigger diode 40 connected to its input, and a triac 42 having its gate electrode connected to trigger diode 40. Resistor 41 is connected between the input terminal of control circuit 22 and the power line neutral wire. Resistor 41, in conjunction with photocell 36, comprises a voltage divider circuit wherein the voltage present at the input of control circuit 22 is a function of the resistance of photocell 36, which resistance is in turn a function of the light received by the photocell. As the light received by photocell 36 increases, its resistance decreases and the voltage presented to the input terminal of control circuit 22 increases. At some predetermined level switching diode 40 causes a signal to be presented to the gate element of triac 42, resulting in triac 42 firing. When triac 42 fires it presents a low impedance across its remaining two terminals, which are connected respectively to the power neutral line and to relay coil 50. A resistor 43 and capacitor 44 are connected in series across triac 42 to compensate for the inductive load presented by relay coil 50 by limiting the rate of change of voltage increase across triac 42. It is thus apparent that an input signal of sufficient magnitude to control circuit 22 results in the energization of relay coil 50, which is connected as the input circuit to connect circuit 25.

Energization of relay coil 50 causes relay contacts 52 and 54 to close, thereby completing the power connection from the power hot and neutral input lines to the equipment 30. This causes the equipment 30 to begin operating, because full line voltage is then applied. Equipment 30 has its outer case or cover 32 connected to circuit ground via push button switch 56. Switch 56 functions as a test switch, to check the operation of the overall control circuit. If switch 56 is depressed, and the equipment immediately ceases operation, the control circuit is functioning properly because switch 56 opens the ground return path back to ground pin 16. In normal operation switch 56 is left in its normally closed position.

The foregoing description of a preferred embodiment of the present invention is limited to detecting the presence or absence of a ground wire connection. As such, the circuit cannot detect a poor ground connection which may be conductive to ground but may still present a resistance of several hundred to several thousand ohms. Such a poor ground connection may be hazardous to an operator, for the operator may present an impedance to ground approximating that of the poor ground connection and current will thereby flow through the operator's body. A further embodiment of the invention will be hereinafter described which overcomes the inability of the circuit of FIG. 2 to detect poor ground connections.

Figure 3:
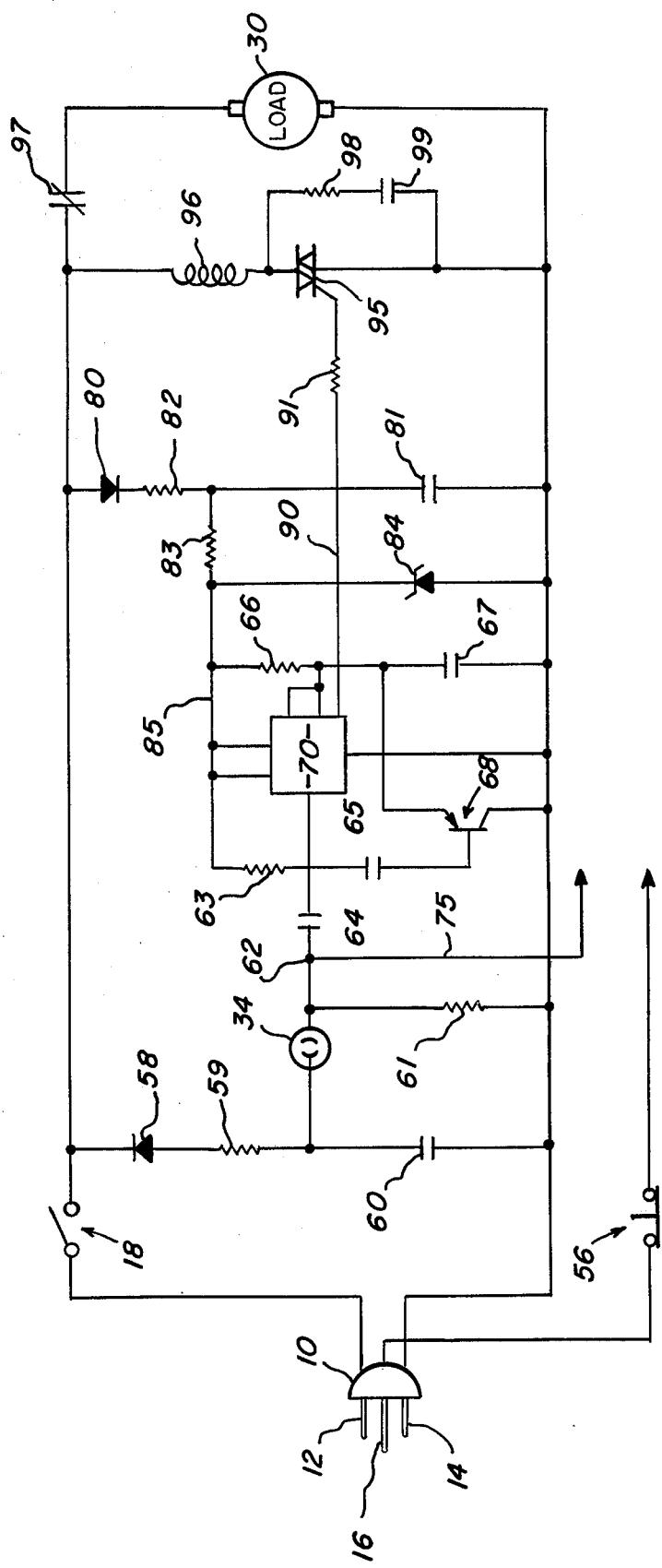
FIG. 3 is a schematic diagram of an alternative embodiment of the invention.

The circuit component values and types which have been found to be useful with the embodiment of FIG. 2 are tabulated below:

Switching diode 40, type MBS 4992, manufactured by Motorola
Triac, type 226071, manufactured by Motorola
Resistor 41, 3,000 ohms (3K)
Resistor 43, 100 ohms
Capacitor 44, 0.1 microfarad (mfd)
Relay 50, type 2110V, manufactured by Guardian Electric Company FIG. 3 illustrates an alternative embodiment of the invention which detects not only an open ground circuit connection but also a ground circuit connection having resistance therein. This embodiment has the sensor, control circuit and connect circuit functions as hereinbefore described, but utilizes additional and different components in its construction. The circuit comprising diode 58, resistor 59, and capacitor 60 is series-connected across the hot and neutral input power lines. Neon lamp 34 is connected at a point between resistor 59 and capacitor 60, the other terminal of neon lamp 34 being connected via bleed resistor 61 to the neutral power line. In normal operation diode 58 causes capacitor 60 to charge with a negative voltage referenced to the neutral line. When the voltage across capacitor 60 reaches approximately 90 volts the neon lamp conducts to discharge capacitor 60 through bleed resistor 61, and also through wire 75 which is connected to the equipment ground point as will be hereinafter described. Thus, the voltage present at connection point 62 will be determined by the parallel resistance combination of resistor 61 together with whatever resistance exists in the equipment ground circuit. Under normal conditions the equipment ground has zero resistance and the signal at connection point 62 is therefore zero volts. To the extent that the equipment ground resistance deviates from zero resistance a voltage signal will be developed at connection point 62. If this voltage signal exceeds a predetermined value, a pulse signal is coupled to the input of integrated circuit 70 via capacitor 64. The repetition rate of this pulse is determined by the respective values of resistor 59 and capacitor 60.

Integrated circuit 70 functions as a timing circuit, and may be preferably typed NE 555, manufactured by Motorola. The DC voltage required for operating integrated circuit 70 is obtained from the power supply circuit comprising diode 80, resistor 82, capacitor 81, resistor 83, and zener diode 84. These components provide a stable plus 12 volt supply to line 85, which in turn is connected to relevant terminals of integrated circuit 70 and to resistor 63 and resistor 66. The preferred values of the circuit components are as follows:

Resistor 59, 820,000 ohms (820 K)
Capacitor 60 2 mfd
Resistor 61, 12 K
Resistor 63, 68 K
Capacitor 64 0.01 mfd
Capacitor 65,
Resistor 66, 2 Megohms
Capacitor 67, .27 mfd
Capacitor 81, 2 mfd
Resistor 82,
Resistor 83, 10 K
Zener diode 84,
Transistor 68,
Diode 58,
Diode 80, Integrated circuit 70 functions as a monostable multivibrator, providing a one-shot output signal on line 90 having a duration determined by the component values of resistor 63 and capacitor 64. The time which a signal is present on line 90 is selected to be longer than the pulse repetition frequency of the signal at connection point 62 so that if pulses are continuously present at connection point 62 the one-shot signal will remain on line 90 until the pulses are removed. The presence of these pulses indicates that the voltage across the parallel combination of resistor 61 and the equipment ground circuit is high enough to be deemed an insufficient ground connection. The trigger signal on line 90 is applied to a triac 95 via resistor 91, and causes triac 95 to fire and thereby energize relay coil 96. The energizing of relay coil 96 causes relay contacts 97 to open and remove the hot line power to equipment 30. A series resistance-capacitor combination comprising resistor 98 and capacitor 99 are wired across triac 95 to compensate for the inductive load effects of relay coil 96, and to thereby reduce the rate of change of voltage across triac 95.

The circuit thus described with reference to FIG. 3 has the capability of de-energizing line voltage to equipment whenever the circuit ground connection becomes either opened or of some low resistance value. The circuit ground point may be selected by appropriate wiring of line 75 to the equipment case or other connection point. The point of connection of line 75 to the equipment is a matter of design choice and preference, and the circuit will function equally well if this connection point is remotely positioned from the actual equipment 30 being energized. For example, in one application this embodiment has been used to monitor the circuit ground connection of an electrically operated paint sprayer whereby the paint spray gun is connected to a motor driven pump through a long hose. The spray gun is kept at ground potential through the use of a wire which forms a part of the hose itself, and is electrically connected to the spray gun body at one end and to the motor frame at its other end. By connecting wire 75 the spray gun body any open or faulty ground circuit connection between connection point 62 and the juncture of the "neutral" and "ground" AC power wires external the system (and usually external the AC plug receptacle) will cause the AC "hot" and "neutral" power connections to be disabled from the equipment.

What is claimed is:

1. An apparatus for sensing an open ground circuit in a three - wire alternating current electrical power circuit wherein a first and second wire carry alternating current respectively and a third wire is a circuit ground wire, comprising:
    a. means for sensing the presence of an alternating current voltage, including a gas discharge lamp having a first impedance when unignited and a second impedance when ignited, and further including a capacitor and diode circuit connected to a lamp terminal and serially to said first and second wires and a resistance connected to a second lamp terminal and to said capacitor-wire connection, whereby rectified alternating voltage periodically voltage-charges said capacitor and causes said lamp to ignite to discharge said capacitor voltage charge into said resistance, and an output terminal connected to said resistance to convey a signal thereon representative of the presence or absence of the sensed alternating current voltage;
    b. means for generating a control signal, including a semiconductor switching element connected to said sensing means output terminal and said second wire, said switching element having an output terminal switchable into low impedance coupling with said second wire in response to a signal on said sensing means output terminal; and
    c. power transfer means, including relay contacts connected in series to at least said first wire and a relay energization coil connected between said first wire and said switching element output terminal, for passing and blocking electrical voltages on at least said first wire.

2. The apparatus of claim 1, wherein said capacitor and resistance are sized to cause the frequency of said lamp ignition to be at least 1000 hertz.

3. The apparatus of claim 1, wherein said means for generating a control signal further comprises a timing circuit, coupled to said periodic voltage discharge circuit in said means for sensing, said timing circuit generating an output signal when said periodic voltage discharges diminish below a predetermined frequency level.

4. An apparatus for sensing a ground circuit having a resistance above a predetermined limit in a three-wire alternating current electrical power circuit and load with ground, wherein a first and second wire carry alternating current to the load and a third wire is a circuit and load ground wire; comprising
    a. a resistance, capacitance and diode circuit serially connected between said first and second wires;
    b. a voltage-breakdown device and a resistance serially connected and wired across said capacitance;
    c. means for connecting the load ground to the junction between said voltage-breakdown device and said serially connected resistance;
    d. a threshhold switching device having an input coupled to said junction between said voltage breakdown device and said serially connected resistance, said threshhold switching device having a switching characteristic such that a signal is generated at an output terminal for a predetermined time when the input signal exceeds a predetermined value; and
    e. a power control circuit connected in series-switching connection between said first wire and said load, said power control circuit being also connected to said threshhold switching device output terminal and actuable by a signal on said output terminal to disconnect said first wire alternating current from said load; whereby a predetermined resistance in said third wire circuit causes a signal to be coupled to said threshhold switching device input.

5. The apparatus of claim 4 wherein said voltage-breakdown device further comprises a gas discharge element.

6. The apparatus of claim 5, further comprising a test switch series connected to said third wire.

7. The apparatus of claim 5, wherein the resistance which comprises the gas discharge element and resistance serial connection across said capacitance is less than 15,000 ohms.

* * * * *